Dec. 12, 1933.  C. O. DALTON  1,938,740
STEERING GEAR
Filed Jan. 14, 1933  3 Sheets-Sheet 1
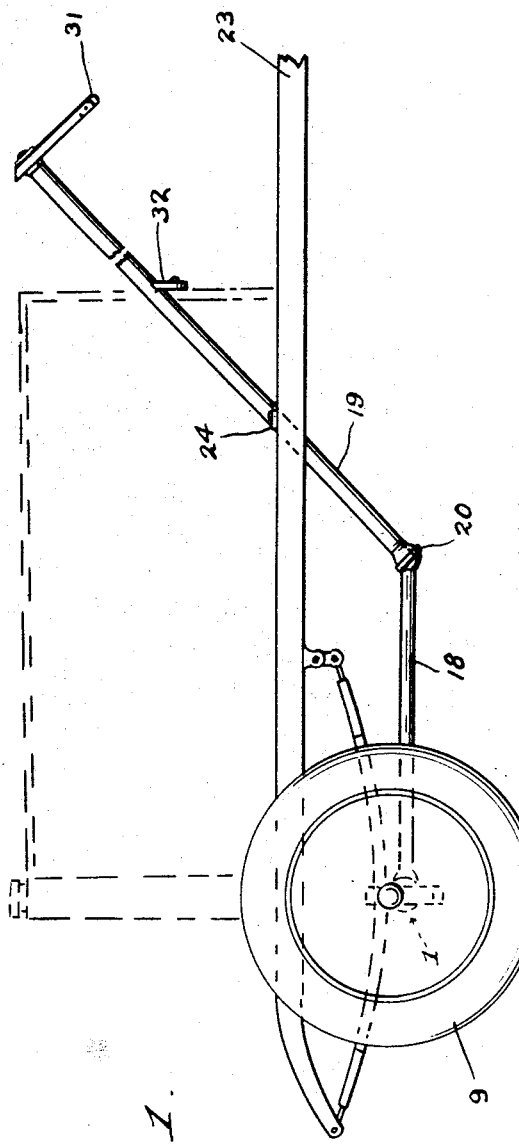
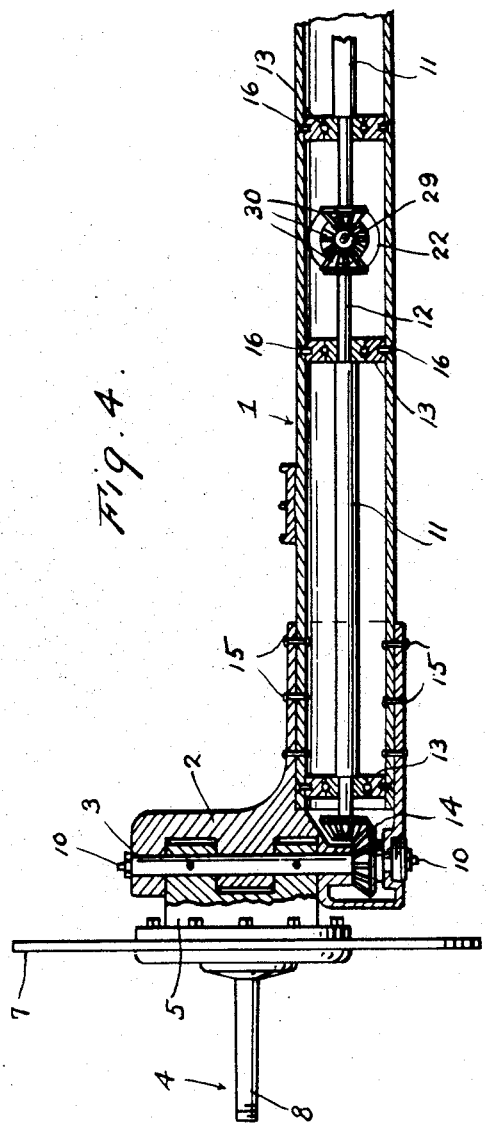
Inventor
*C. O. Dalton*
By *Clarence A O'Brien*
Attorney

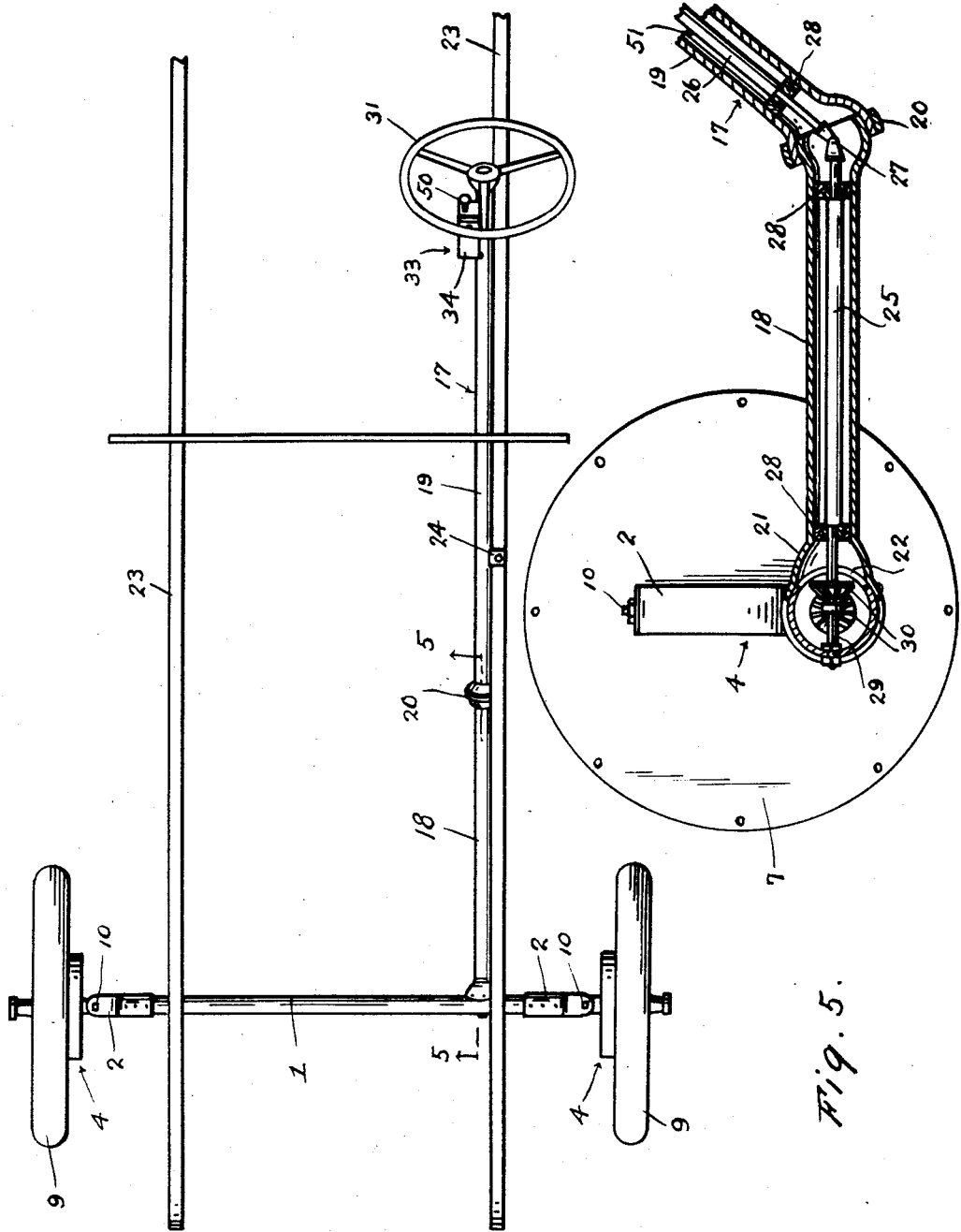

Dec. 12, 1933.  C. O. DALTON  1,938,740
STEERING GEAR
Filed Jan. 14, 1933  3 Sheets-Sheet 3
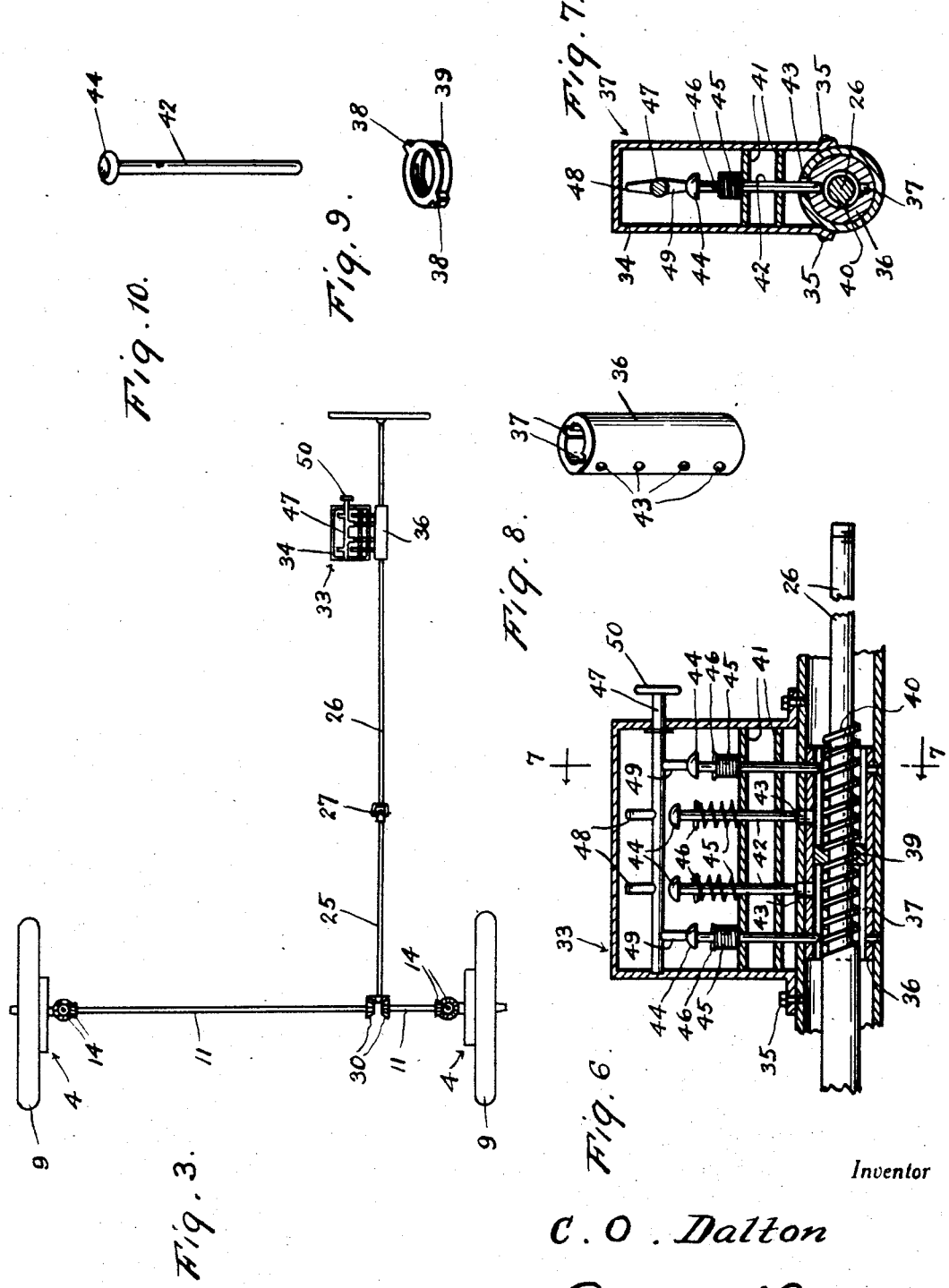
Inventor
C. O. Dalton Patented Dec. 12, 1933

1,938,740

UNITED STATES PATENT OFFICE 1,938,740

STEERING GEAR

Cecil O. Dalton, Dallas, Tex.

Application January 14, 1933. Serial No. 651,818

3 Claims. (Cl. 74—40)

The present invention relates to new and useful improvements in steering gears for wheeled vehicles, particularly automobiles, and has for some of its objects to provide, in a manner as hereinafter set forth, a steering gear which will be simple in construction, strong, durable, compact, reliable and which may be manufactured at low cost.

Another important object of the invention is to provide a vehicle steering gear of the aforementioned character embodying novel means for limiting the turning movement of the spindles or stub axles upon which the wheels are journalled.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of a steering gear in accordance with the present invention.

Figure 2 is a view in top plan thereof.

Figure 3 is a top plan view with portions removed to disclose the mechanism.

Figure 4 is a vertical sectional view through a portion of the front axle, showing a spindle assembly mounted thereon.

Figure 5 is a view in vertical longitudinal section, taken substantially on the line 5—5 of Figure 2.

Figure 6 is a detail view in vertical longitudinal section through the control unit.

Figure 7 is a view in vertical transverse section, taken substantially on the line 7—7 of Figure 6.

Figure 8 is a detail view in perspective of the sleeve forming a part of the control unit.

Figure 9 is a detail view in perspective of the slidable element constituting a part of the control unit.

Figure 10 is a detail view in perspective of one of the plungers constituting a part of the control unit.

Referring now to the drawings in detail, it will be seen that the embodiment of the invention which has been illustrated comprises a tubular front axle 1 having fixed on its end portions castings 2 upon which spindle assemblies are mounted for swinging movement in a horizontal plane through the medium of pins 3 upon which said spindle assemblies are fixed. The spindle assemblies are designated generally by the reference numeral 4 and each comprises inner and outer sections 5 and 6, respectively, which are bolted together and between which a brake shoe supporting plate 7 is fixed. The outer section 6 includes a spindle 8 and, of course, the front wheels 9 of the vehicle are journalled on said spindles 8. Lubricant injecting fittings 10 are provided on the upper and lower ends of the pins 3.

The reference numeral 11 designates alined shafts which are mounted in the tubular axle 1, said shafts including reduced end portions 12 which are journalled in suitable bearings 13 which are provided therefore in the axle 1. Gears 14 connect the pins 3 to the shafts 11 for actuation thereby. As best seen in Figure 4 of the drawings, the lower portion of each casting 2 is of hollow construction to accommodate the gears 14 and the end portions of the tubular axle 1. The castings 2 are secured on the tubular axle 1 by any suitable means, such as rivets or screws 15 and the bearings 13 are secured in position through the medium of countersunk screws 16.

A steering shaft housing designated generally by the reference numeral 17 is provided, said steering shaft housing including sections 18 and 19 which are connected with each other, at one end, by a suitable type of universal joint 20. The forward end portion of the section 18 is enlarged or flared and secured to the tubular axle 1, as at 21. The tubular axle 1 communicates with the housing section 18 through an opening 22. The housing section 19 is mounted on the frame 23 of the vehicle through the medium of a suitable bracket 24.

The reference numerals 25 and 26 designate shafts which are mounted in the housing sections 18 and 19, respectively. The shafts 25 and 26 are connected with each other by a suitable universal joint 27 in the universal joint 20 and said shafts are provided with reduced end portions which are journalled in suitable bearings 28. The forward end of the shaft 25 is engaged in a socketed member 29 which is adjustably mounted in the tubular axle 1. The shafts 11 are connected to the shaft 25 for actuation in opposite directions thereby through the medium of gears 30. The reference numeral 31 designates a steering wheel fixed on the upper end portion of the shaft 26. The housing section 19 is also provided with a suitable bracket 32 which is secured to the body of the vehicle.

Mounted on an upper portion of the housing section 19 is a control unit which is designated generally by the reference numeral 33. The control unit 33 includes a casing 34 which is secured in any suitable manner, as at 35, on the housing section 19. A sleeve 36 is fixed in that portion of the housing section 19 upon which casing 34 is mounted and said sleeve has formed therein diametrically opposite, longitudinal grooves 37 which accommodate lugs 38 on a ring 39 which is mounted for longitudinal movement in said sleeve. The sleeve 36 encircles a threaded portion 40 of the shaft 26 upon the ring 39 is threadedly mounted, as illustrated to advantage in Figure 6 of the drawings. It will be noted that the upper portion of the shaft 26 is reduced.

The reference numeral 41 designates spaced plates in the casing 34 having alined openings therein which accommodates slidable plungers 42. The housing section 19 and the sleeve 36 are provided with alined openings 43 for the reception of the plungers 42. The openings in the sleeve 36 communicate with one of the grooves 37.

Each plunger 42 includes a rounded socketed head 44, the purpose of which will be presently set forth. Coil springs 45 encircle the plungers 42 and have one end engaged with the outermost plate 41 and their other ends engaged with pins 46 which are mounted transversely in said plungers for yieldingly urging the plungers toward inoperative position. Journalled in the casing 34 is a shaft 47 having pairs of cams 48 and 49 thereon for actuating the plungers 42 against the tension of the springs 45. The shaft 47 projects outwardly from the casing 34 and has fixed thereon an actuating disk 50, said disk being provided with suitable means through the medium of which it may be ascertained which pair of cams is engaged with the plungers.

In operation, the spindle assemblies 4 are swung in a horizontal plane by the steering wheel 31 through the medium of the shaft 26, the universal joint 27, the shaft 25, the gears 30, the shafts 11, the gears 14 and the pins 3, as will be apparent. As previously stated, the unit 33 provides means for adjustably controlling the degree of movement of the spindle assemblies 4. When the shaft 47 is adjusted to one position, the cams 49 actuate the outermost plungers 42 to dispose the inner end portions of said outermost plungers in the path of the ring 39 which is threadedly mounted on the shaft 26, thus limiting the rotation of said shaft. The socketed heads 44 of the plungers receive the cams for releasably securing the shaft 47 in adjusted position. When it is desired to further limit the rotation of the shaft 26, the shaft 47 is rotated to operatively engage cams 48 with the innermost plungers 42, thus actuating said innermost plungers to operative position and permitting the outermost plungers to be returned to inoperative position by their respective springs 45. The reference numeral 51 (see Figure 5) designates a conduit which may be provided in the housing section 19 for conductive wires.

It is believed that the many advantages of a steering gear constructed in accordance with the present invention will be readily understood, and although the preferred embodiment of the invention is illustrated and described, it is to be understood that changes in the details of construction and in the combination and arrangement of parts may be resorted to which will fall within the scope of the invention as claimed.

Having thus described my invention, what I claim as new is:

1. A steering gear comprising a housing, a threaded shaft journalled in the housing, a sleeve mounted in the housing and encircling the shaft, said sleeve having longitudinal grooves therein, a ring threadedly mounted on the shaft, lugs on the ring engaged in the grooves of the sleeve, a casing mounted on the housing, plungers slidably mounted in the casing, the sleeve and the housing having alined openings therein for the reception of the plungers, and means for manually projecting the plungers into the alined openings for engagement by the ring for limiting rotation of the shaft.

2. A steering gear comprising a housing, a threaded shaft journalled in the housing, a sleeve mounted in the housing and encircling the shaft, said sleeve having longitudinal grooves therein, a ring threadedly mounted on the shaft, lugs on the ring engaged in the grooves of the sleeve, a casing mounted on the housing, plungers slidably mounted in the casing, the sleeve and the housing having alined openings therein for the reception of the plungers, and means for manually projecting the plungers into the alined openings for engagement by the ring for limiting rotation of the shaft, said means including a shaft journalled in the casing, and cams on the last named shaft operatively engageable with the plungers.

3. A steering gear comprising a housing, a threaded shaft journalled in the housing, a member threadedly mounted on the shaft, means for retaining the member against rotation with the shaft, slidable plungers engageable with the member for limiting the longitudinal movement of said member in the housing, and means for actuating the plungers to operative and inoperative position.

CECIL O. DALTON.